United States Patent
Hibbert et al.

(10) Patent No.: US 10,646,783 B1
(45) Date of Patent: May 12, 2020

(54) LINKING REAL WORLD ACTIVITIES WITH A PARALLEL REALITY GAME

(71) Applicant: Niantic, Inc., San Francisco, CA (US)

(72) Inventors: Chris Hibbert, Mountain View, CA (US); John V. Hanke, Piedmont, CA (US); Phillip Craig Keslin, San Jose, CA (US); Leor Stern, Belmont, CA (US); Mark A. Aubin, Sunnyvale, CA (US); James Dinkelacker, Lahaina, HI (US); William J. Kilday, Austin, TX (US); Yennie Solheim, San Francisco, CA (US); Keith P. Golden, San Francisco, CA (US); Charles Spirakis, Los Altos, CA (US)

(73) Assignee: Niantic, Inc., San Francisco, CA (US)

( * ) Notice: Subject to any disclaimer, the term of this patent is extended or adjusted under 35 U.S.C. 154(b) by 114 days.

(21) Appl. No.: 15/586,129

(22) Filed: May 3, 2017

Related U.S. Application Data

(63) Continuation of application No. 13/955,080, filed on Jul. 31, 2013, now Pat. No. 9,669,296.

(Continued)

(51) Int. Cl.
*A63F 13/216* (2014.01)
*A63F 13/65* (2014.01)
(Continued)

(52) U.S. Cl.
CPC ............ *A63F 13/65* (2014.09); *A63F 13/216* (2014.09); *A63F 13/35* (2014.09); *A63F 13/5378* (2014.09)

(58) Field of Classification Search
None
See application file for complete search history.

(56) References Cited

U.S. PATENT DOCUMENTS 6,530,841 B2   3/2003   Bull et al.
6,811,084 B2   11/2004  Tatsuta et al.
(Continued)

FOREIGN PATENT DOCUMENTS

EP    1 574 238 A1    9/2005
EP    2 101 889 A1    9/2009
(Continued)

OTHER PUBLICATIONS

Empire Avenue, "About Empire Avenue", Date Unknown, one page. [Online] [Retrieved Jul. 31, 2013] Retrieved from the internet <www.empireavenue.com/about/>.

(Continued)

*Primary Examiner* — Jay Trent Liddle
*Assistant Examiner* — Alex F. R. P. Rada, II
(74) *Attorney, Agent, or Firm* — Fenwick & West LLP

(57) ABSTRACT

Systems and methods for linking real world activity, such as real world commercial activity or real world data collection activity, with a location-based parallel reality game are provided. In particular, a game server hosting a parallel reality game can modify, update, or add to game data stored in a game database associated with the parallel reality game to include certain game features in the parallel reality game linked with real world activity in the real world. The game features can be linked with activities in the real world such that player actions associated with the game features in the virtual world can lead to or encourage activity in the real world, such as commercial activity and/or data collection activity in the real world.

9 Claims, 6 Drawing Sheets

Related U.S. Application Data

(60) Provisional application No. 61/677,522, filed on Jul. 31, 2012.

(51) Int. Cl.
*A63F 13/35* (2014.01)
*A63F 13/5378* (2014.01)

(56) References Cited

U.S. PATENT DOCUMENTS

| | | | |
|---|---|---|---|
| 7,275,994 B2 | 10/2007 | Eck et al. | |
| 7,435,179 B1 | 10/2008 | Ford | |
| 7,491,123 B2 | 2/2009 | Smith | |
| 7,564,469 B2 | 7/2009 | Cohen | |
| 7,946,919 B2 | 5/2011 | Piccionelli | |
| 7,970,749 B2 | 6/2011 | Uhlir et al. | |
| 8,002,617 B1 | 8/2011 | Uskela et al. | |
| 8,070,608 B2 | 12/2011 | Uhlir et al. | |
| 8,108,459 B1 | 1/2012 | Hoffman et al. | |
| 8,190,733 B1 | 5/2012 | Hoffman et al. | |
| 8,267,794 B2 | 9/2012 | Van Luchene | |
| 8,287,383 B1 | 10/2012 | Etter et al. | |
| 8,291,016 B1 | 10/2012 | Whitney et al. | |
| 8,308,568 B2 | 11/2012 | Amaitis et al. | |
| 8,366,446 B2 | 2/2013 | Kreiner et al. | |
| 8,944,910 B1 | 2/2015 | Boyle | |
| 9,669,293 B1 | 6/2017 | Kornmann et al. | |
| 2001/0009867 A1 | 7/2001 | Sakaguchi et al. | |
| 2002/0090985 A1* | 7/2002 | Tochner | A63F 13/12 463/1 |
| 2003/0036428 A1 | 2/2003 | Aasland | |
| 2003/0224855 A1 | 12/2003 | Cunningham | |
| 2004/0029625 A1 | 2/2004 | Annunziata | |
| 2004/0058732 A1 | 3/2004 | Piccionelli | |
| 2004/0255268 A1 | 12/2004 | Meijer et al. | |
| 2005/0049022 A1 | 3/2005 | Mullen | |
| 2006/0105838 A1 | 5/2006 | Mullen | |
| 2006/0258420 A1 | 11/2006 | Mullen | |
| 2006/0281553 A1 | 12/2006 | Hawkins et al. | |
| 2006/0284789 A1 | 12/2006 | Mullen | |
| 2006/0287026 A1 | 12/2006 | Mullen | |
| 2007/0021166 A1 | 1/2007 | Mattila | |
| 2007/0060408 A1 | 3/2007 | Schultz et al. | |
| 2007/0104348 A1 | 5/2007 | Cohen | |
| 2007/0149284 A1 | 6/2007 | Plavetich et al. | |
| 2007/0281765 A1 | 12/2007 | Mullen | |
| 2007/0281766 A1 | 12/2007 | Mullen | |
| 2008/0015018 A1 | 1/2008 | Mullen | |
| 2008/0015024 A1 | 1/2008 | Mullen | |
| 2008/0114538 A1* | 5/2008 | Lindroos | G01C 21/26 701/433 |
| 2008/0146338 A1 | 6/2008 | Bernard et al. | |
| 2009/0005140 A1* | 1/2009 | Rose | A63F 13/00 463/7 |
| 2009/0017913 A1* | 1/2009 | Bell | H04W 4/02 463/40 |
| 2009/0024986 A1 | 1/2009 | Meijer et al. | |
| 2009/0281851 A1 | 11/2009 | Newton et al. | |
| 2010/0287011 A1 | 11/2010 | Muchkaev | |
| 2010/0331089 A1 | 12/2010 | Priebatsch et al. | |
| 2011/0004658 A1 | 1/2011 | Chesley et al. | |
| 2011/0081973 A1 | 4/2011 | Hall | |
| 2011/0319148 A1* | 12/2011 | Kinnebrew | A63F 13/216 463/1 |
| 2012/0040745 A1 | 2/2012 | Auterio et al. | |
| 2012/0052953 A1 | 3/2012 | Annambhotla et al. | |
| 2012/0094770 A1 | 4/2012 | Hall | |
| 2012/0157210 A1 | 6/2012 | Hall | |
| 2012/0185892 A1 | 7/2012 | Camplejohn et al. | |
| 2012/0190452 A1 | 7/2012 | Weston et al. | |
| 2012/0226627 A1 | 9/2012 | Yang | |
| 2012/0231887 A1 | 9/2012 | Lee et al. | |
| 2012/0233258 A1 | 9/2012 | Vijayaraghavan et al. | |
| 2012/0244945 A1 | 9/2012 | Kolo et al. | |
| 2012/0246104 A1 | 9/2012 | Di Sciullo et al. | |
| 2012/0253488 A1* | 10/2012 | Shaw | G06Q 10/04 700/91 |
| 2012/0315992 A1 | 12/2012 | Gerson et al. | |
| 2013/0004932 A1 | 1/2013 | Mahajan et al. | |
| 2013/0005475 A1 | 1/2013 | Mahajan et al. | |
| 2013/0005480 A1 | 1/2013 | Bethke et al. | |
| 2013/0072308 A1 | 3/2013 | Peck et al. | |
| 2013/0117326 A1 | 5/2013 | De Smet et al. | |
| 2013/0178257 A1 | 7/2013 | Langseth | |
| 2014/0057725 A1 | 2/2014 | Mahajan et al. | |
| 2015/0089607 A1 | 3/2015 | Hubner et al. | |

FOREIGN PATENT DOCUMENTS

| | | |
|---|---|---|
| EP | 2 393 056 A1 | 12/2011 |
| EP | 2 416 289 A1 | 2/2012 |
| WO | WO 02/062436 A2 | 8/2002 |
| WO | WO 2008/076764 A1 | 6/2008 |

OTHER PUBLICATIONS klout.com, "Klout Score", Date Unknown, four pages. [Online] [Retrieved Apr. 1, 2013] Retrieved from the internet <http://klout.com/corp/klout_score>.

Matyas, S., "Playful Geospatial Data Acquisition by Location-based Gaming Communities",The International Journal of Virtual Reality, 2007, 6(3): 1-10.

United States Office Action, U.S. Appl. No. 13/955,080, dated Jun. 28, 2016, 13 pages.

International Search Report and Written Opinion, PCT Application No. PCT/IB2018/055443, dated Nov. 27, 2018, 9 pages.

* cited by examiner

1

LINKING REAL WORLD ACTIVITIES WITH A PARALLEL REALITY GAME

PRIORITY CLAIMS

This application is a continuation of U.S. patent application Ser. No. 13/955,080, filed in Jul. 31, 2013, which claims the benefit of priority of U.S. Provisional Patent Application 61/677,522, filed on Jul. 31, 2012. Each of the applications is incorporated herein by reference.

FIELD

The present disclosure relates generally to location-based gaming, and more particularly, to a system and method for linking real world activity, such as commercial activity and/or data collection activity, with a location-based parallel reality game.

BACKGROUND

Computer-based and/or electronic gaming systems are known that provide a shared virtual environment for many players to interact in a virtual world. With increased availability and connectivity to the Internet, many players from all over the world can interact in the virtual environment and perform various game objectives. Such gaming systems typically do not have a virtual world geography that parallels the real world. Location-based games use the real world as their geography. Some location-based games add virtual locations on a map that parallels the real world geography. Such games, however, are typically focused on real world objectives. These games typically do not include a virtual world that parallels the real world and that acts as a virtual game environment in which many players can interact and perform various game objectives in the parallel virtual world by navigating and performing actions in the real world.

A parallel reality game providing a shared virtual world that parallels at least a portion of the real world can host a variety of interactions that can attract a community of players. Providing a virtual world with a geography that parallels at least a portion of the real world allows players to navigate the virtual world by navigating the real world. Linking virtual elements in the virtual environment with real world objects, locations, and actions in the real world can encourage players to travel to and notice features in the real world that the players would normally ignore. Providing virtual elements in the same location in the virtual world as their counterpart real world objects and/or locations in the real world increases the feeling that virtual elements are hidden parts of the real world.

A parallel reality game can include game features that encourage players to interact in the virtual world, such as through social interactions with other players in the virtual world and through various game objectives in the virtual world. Certain game features can be provided to more closely link the parallel virtual world with the real world.

SUMMARY

Aspects and advantages of embodiments of the invention will be set forth in part in the following description, or may be obvious from the description, or may be learned through practice of the embodiments.

One exemplary aspect of the present disclosure is directed to a computer-implemented method of providing a parallel reality game. The method includes hosting, at a game server, a parallel reality game, the parallel reality game having a virtual world with a geography that parallels at least a portion of the geography of the real world such that a player can navigate the virtual world by moving to different geographic locations in the real world. The method includes modify game data to include a game feature in the parallel reality game. The game feature is linked with a real world activity, such as a commercial activity in the real world or a data collection activity in the real world. The method further includes receiving data associated with a player interaction with the game feature, and modifying one or more game elements associated with the virtual world based on the player interaction.

Other exemplary implementations of the present disclosure are directed to systems, apparatus, non-transitory computer-readable media, devices, and user interfaces for linking real world activity with a location-based parallel reality game.

These and other features, aspects and advantages of various embodiments will become better understood with reference to the following description and appended claims. The accompanying drawings, which are incorporated in and constitute a part of this specification, illustrate embodiments of the invention and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
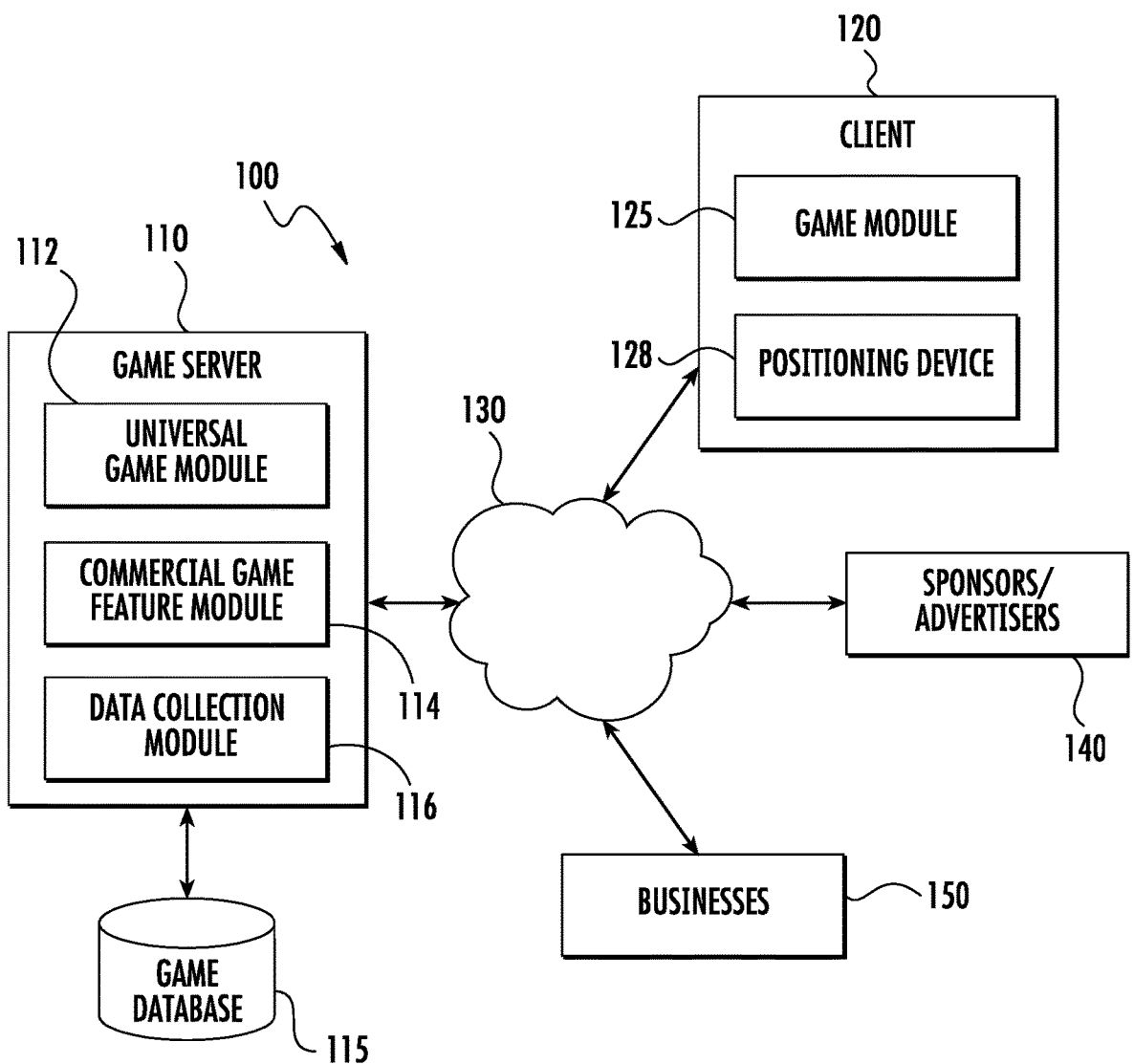
FIG. 1 depicts an exemplary computer-based system for implementing a location-based game according to an exemplary embodiment of the present disclosure.

Reference now will be made in detail to embodiments of the invention, one or more examples of which are illustrated in the drawings. Each example is provided by way of explanation of the embodiments, not limitation of the invention. In fact, it will be apparent to those skilled in the art that various modifications and variations can be made to the embodiments without departing from the scope or spirit of the invention. For instance, features illustrated or described as part of one embodiment can be used with another embodiment to yield a still further embodiment. Thus, it is intended that aspects of the present disclosure cover such modifications and variations.

Overview

Generally, the present disclosure is directed to a computer-based system and method for linking real world activity, such as real world commercial activity and/or real world data collection activity, with a location-based parallel reality game. In particular, a game server hosting a parallel reality game can modify, update, or add to game data stored in a game database associated with the parallel reality game to include certain game features in the parallel reality game. The game features can be linked with commercial activity and/or data collection activity in the real world. For instance, the game features can be linked with activities in the real world such that player actions associated with the game features in the virtual world can lead to or encourage commercial activity and/or data collection activity in the real world. Linking a location-based parallel reality game with real world activity according to aspects of the present disclosure can have a technical effect of providing for the efficient and improved selection of a virtual game features associated with real world activity to further enhance the link between the parallel virtual world and the real world in the game.

More particularly, a game server can host a location-based parallel reality game having a player gaming area that includes a virtual environment with a geography that parallels at least a portion of the real world geography. Players can navigate a range of coordinates defining a virtual space in the virtual world by navigating a range of geographic coordinates in the real world. In particular, the positions of players can be monitored or tracked using, for instance, a positioning system (e.g. a GPS system) associated with a player's mobile device. Player position information can be provided to a game server hosting the parallel reality game over a network and can be used by the game server hosting the parallel reality game to update player locations in the virtual world. As a result, as the player continuously moves about in a range of coordinates in the real world, the player also continuously moves about in a range of coordinates in the parallel virtual world.

The virtual world can include one or more virtual elements that are linked with real world landmarks/locations. For instance, the virtual world can include various virtual elements associated with landmarks, museums, works of art, libraries, or other areas of interest in the real world. The virtual elements linked with real world landmarks/locations can provide the illusion that the virtual world is a hidden dimension of the real world that a player can interact with by playing the parallel reality game. For instance, as players navigate geographic coordinates in the real world, the players can discover and interact with virtual elements provided in the parallel virtual world. Various game objectives can require players to interact with these virtual elements as part of the location-based game.

A location-based parallel reality game necessarily includes a link between the real world and the parallel virtual world. To improve the link between the real world and the parallel virtual world, certain game features can be linked with real world activity, such as real world commercial activity and/or real world data collection activity, to enhance the impact actions in the virtual world have on actions in the real world and vice versa, improving the user experience in the parallel reality game.

According to one exemplary embodiment of the present disclosure, game features linked with commercial activity in the real world can be included in the parallel reality game such that player actions while playing the parallel reality game can encourage or incentivize commercial activity in the real world. Sponsors, advertises, businesses, and other entities can request certain game features to be included in the parallel reality game to increase the exposure of the business or other entity to players of the parallel reality game.

For instance, a sponsor, business or other entity can provide a request to a game server hosting a parallel reality game over a network requesting that certain game features linked with commercial activity in the real world be added to the parallel reality game. The game server can analyze the request and determine whether to add the requested game features to the game. Once the game server determines to add a particular game feature to the parallel reality game, the game server can modify, update, or add game data to a game database associated with the parallel reality game to include the game feature. The game server can then host or provide access to the parallel reality game with the requested game feature to a plurality of players of the parallel reality game.

As one example, entities can attract customers to their real world locations by requesting that virtual elements or other game features be located at a location in the virtual world corresponding to a location of commercial activity associated with the entity in the real world. These virtual elements or game features can be designed within the virtual world to be beneficial or necessary to visit to achieve certain game objectives or achievements within the parallel reality game. As a result, sponsors and other entities can attract customers to their real world locations by requesting and arranging for certain virtual elements to be located at particular locations within the parallel reality game.

As another example, a business or other entity that desires to increase its visibility to customers can arrange for game features to be linked to the real world purchase of merchandise or services. For instance, the purchase of a particular item or service in the real world can be linked with enhanced powers, hidden game features or game objectives, or other items/events that are valuable in the virtual world. This gives players of the parallel reality game an incentive to visit the business or other entity, to purchase the item or service, and to talk about their experience with friends and other players of the parallel reality game.

As yet another example, the parallel reality game can include a rewards module that is configured to distribute coupons, vouchers, or other rewards useful in the real world to players of the parallel reality game that reach certain achievements or complete certain game objectives within the virtual world. For instance, a business or other entity can arrange for a coupon, discount, voucher, or other reward associated with the business to be distributed to players upon the completion of certain game tasks or game objectives. This can encourage commercial activity in the real world using the coupon, discount, voucher, or other reward based on player action in the parallel virtual world.

As still yet another example, a sponsor or other entity can arrange for the tagging or branding of certain virtual items, virtual locations, or other virtual elements in the virtual world. These branded elements can increase the visibility of the sponsor or other entity to players of the game. If the branded elements are valuable or powerful within the location based game, word about the branded elements can spread virally among players of the game, providing increased visibility to the sponsor or other entity.

According to another exemplary embodiment of the present disclosure, the parallel reality game can include game features that are linked with data collection activities in the real world. The game features can be directly linked with a data collection activity or indirectly linked with a data collection activity. The data collected by the player as a result of performing the data collection activity can be in the form of a photograph, a sound recording, textual information, or other suitable data (e.g. the location of WiFi hotspots, Bluetooth connections, etc.). The collected information can be sent to the game server which can analyze and use the data to improve data associated with the real world. The improved data can then be made available for access by various platforms, such as search engines, encyclopedias, geographic information systems (e.g. maps services, virtual globe services, etc.) and other platforms.

An exemplary game feature directly linked with data collection activity can include a game objective or task in the virtual world that involves acquiring information about the real world and providing this information as a condition for completion of the game objective. For example, a game objective associated with a virtual element can require a player to take a photograph of a particular landmark, art object, store front, or other feature located in the real world at a location corresponding to the location of a virtual element. In return for completing the game objective, the player can receive a suitable reward, such as a virtual reward suitable for use in the virtual world or a reward suitable for use in the real world. For instance, the reward can be in the form of virtual items/energy/currency or other virtual elements. The reward can also include enabling some element of game play (e.g. hidden tasks/items, power ups, enhanced powers) that may not be available to other players that do not interact with the game feature.

An exemplary game feature indirectly linked with data collection activity can include placing virtual elements at particular locations in the virtual world so that actions players take to interact with the virtual elements indirectly reveal information about the real world. For instance, a virtual object can be located in the virtual world at a location corresponding to a park, hiking area, or other locale. By tracking player movements in the virtual world to navigate to the virtual object, the game system can also track corresponding movements in the real world, providing an indication of the location of traversable paths in an the area.

As multiple players interact with the game feature linked with the data collection activity, the accuracy and extent of collected data associated with the real world can be improved. For example, if multiple people take a picture of an art object or other feature, it is likely that the photographs will be taken from different angles. These different pictures can be assembled to get a three-dimensional and/or panoramic view (e.g. a street level image) of the art object or other feature that would not be possible with just a single photograph. In addition, by knowing a player's location in the real world at the time of the data collection action, position data can be associated with the collected data to further enrich the collected data.

Exemplary Location-Based Parallel Reality Gaming System

Exemplary computer-implemented location-based gaming systems according to exemplary embodiments of the present disclosure will now be set forth. The present subject matter will be discussed with reference to a parallel reality game. A parallel reality game is a location-based game having a virtual world geography that parallels at least a portion of the real world geography such that player movement and actions in the real world affect actions in the virtual world and vice versa. Those of ordinary skill in the art, using the disclosures provided herein, should understand that the subject matter of the present disclosure is equally applicable to other gaming systems. In addition, the inherent flexibility of computer-based systems allows for a great variety of possible configurations, combinations, and divisions of tasks and functionality between and among the components of the system. For instance, the systems and methods according to aspects of the present disclosure can be implemented using a single computing device or across multiple computing devices.

FIG. 1 illustrates an exemplary computer-implemented location-based gaming system 100 configured in accordance with an embodiment of the present disclosure. The location-based gaming system 100 provides for the interaction of a plurality of players in a virtual world having a geography that parallels the real world. In particular, a geographic area in the real world can be linked or mapped directly to a corresponding area in the virtual world. A player can move about in the virtual world by moving to various geographic locations in the real world. For instance, the system 100 can track a player's position in the real world and update the player's position in the virtual world based on the player's current position in the real world.

Figure 2:
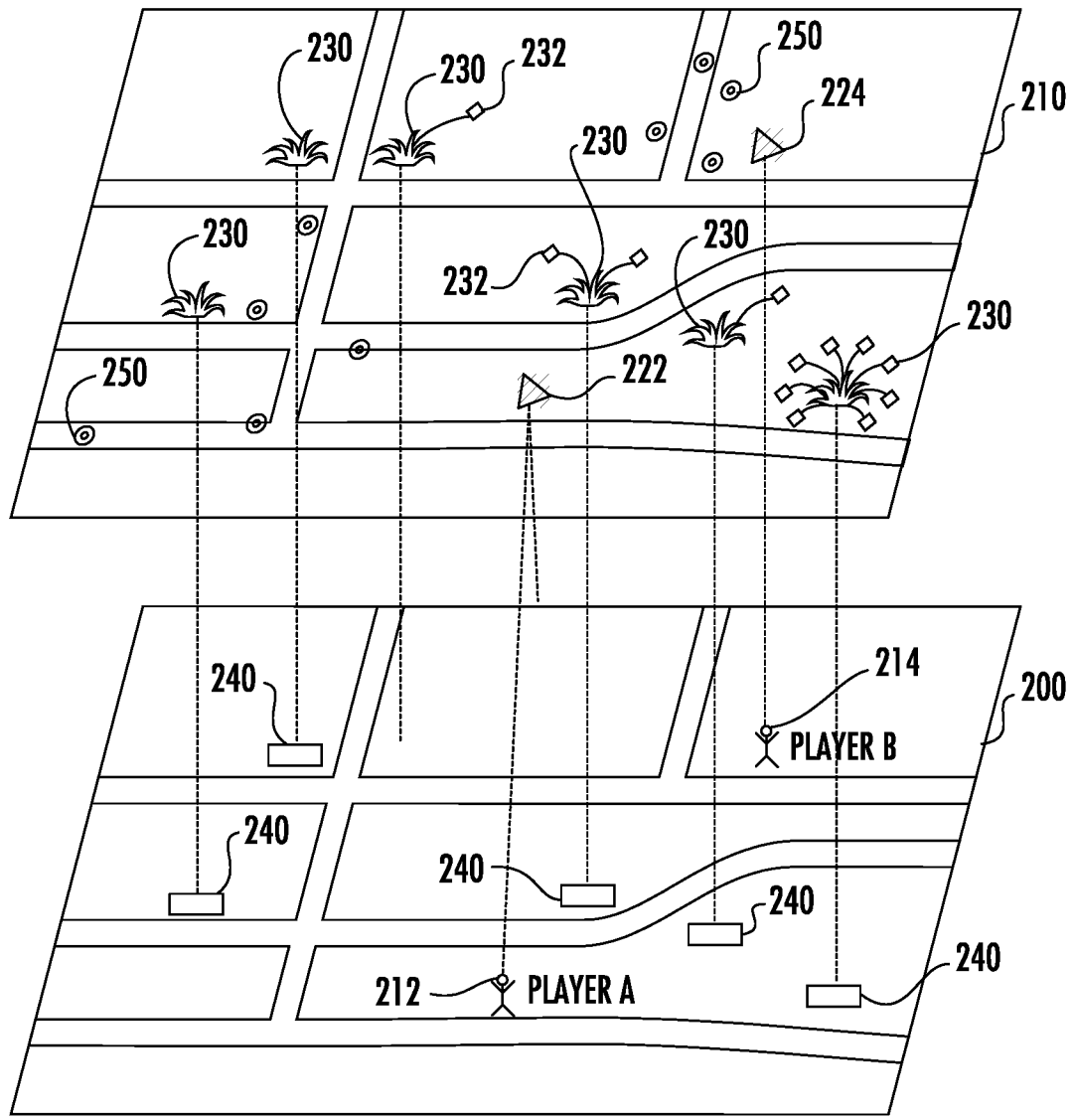
FIG. 2 depicts a representation of a virtual world having a geography that parallels the real world.

FIG. 2 depicts a conceptual diagram of a virtual world 210 that parallels the real world 200 that can act as the game board for all players of a location-based game according to an exemplary embodiment of the present disclosure. As illustrated, the virtual world 210 can include a geography that parallels the geography of the real world 200. In particular, a range of coordinates defining a geographic area or space in the real world 200 is mapped to a corresponding range of coordinates defining a virtual space in the virtual world 210. The range of coordinates in the real world 200 can be associated with a town, neighborhood, city, campus, locale, a country, continent, the entire globe, or other geographic area. Each geographic coordinate in the range of geographic coordinates is mapped to a corresponding coordinate in a virtual space in the virtual world.

A player's position in the virtual world 210 corresponds to the player's position in the real world 200. For instance, the player A located at position 212 in the real world 200 has a corresponding position 222 in the virtual world 210. Similarly, the player B located at position 214 in the real world has a corresponding position 224 in the virtual world. As the players move about in a range of geographic coordinates in the real world, the players also move about in the range of coordinates defining the virtual space in the virtual world 210. In particular, a positioning system associated with a mobile device carried by the player (e.g. a GPS system) can be used to track a player's position as the player navigates the range of geographic coordinates in the real world. Data associated with the player's position in the real world 200 is used to update the player's position in the corresponding range of coordinates defining the virtual space in the virtual world 210. In this manner, players can navigate a continuous track in the range of coordinates defining the virtual space in the virtual world 210 by simply traveling among the corresponding range of geographic coordinates in the real world 200 without having to check in or periodically update location information at specific discrete locations in the real world 200.

The location-based game can include a plurality of game objectives requiring players to travel to and/or interact with various virtual elements and/or virtual objects scattered at various virtual locations in the virtual world. A player can travel to these virtual locations by traveling to the corresponding location of the virtual elements or objects in the real world. For instance, a positioning system can continuously track the position of the player such that as the player continuously navigates the real world, the player also continuously navigates the parallel virtual world. The player can then interact with various virtual elements and/or objects at the specific location to achieve or perform one or more game objectives.

For example, referring to FIG. 2, a game objective can require players to capture or claim ownership of virtual elements 230 located at various virtual locations in the virtual world 210. These virtual elements 230 can be linked to landmarks, geographic locations, or objects 240 in the real world 200. The real world landmarks or objects 240 can be works of art, monuments, buildings, businesses, libraries, museums, or other suitable real world landmarks or objects. To capture these virtual elements 230, a player must travel to the landmark or geographic location 240 linked to the virtual elements 230 in the real world and must perform any necessary interactions with the virtual elements 230 in the virtual world 210. For example, player A of FIG. 2 will have to travel to a landmark 240 in the real world 200 in order to interact with or capture a virtual element 230 linked with that particular landmark 240. The interaction with the virtual element 230 can require action in the real world, such as taking a photograph and/or verifying, obtaining, or capturing other information about the landmark or object 240 associated with the virtual element 230.

Game objectives can require that players use one or more virtual items that are collected by the players in the location-based game. For instance, the players may have to travel the virtual world seeking virtual items (e.g. weapons or other items) that can be useful for completing game objectives. These virtual items can be found or collected by traveling to different locations in the real world or by completing various actions in either the virtual world or the real world. In the example shown in FIG. 2, a player uses virtual items 232 to capture one or more virtual elements 230. In particular, a player can deploy virtual items 232 at locations in the virtual world 210 proximate the virtual elements 230. Deploying one or more virtual items 232 proximate a virtual element 230 can result in the capture of the virtual element 230 for the particular player or for the team and/or faction of the particular player.

In one particular implementation, a player may have to gather virtual energy as part of the location-based game. As depicted in FIG. 2, virtual energy 250 can be scattered at different locations in the virtual world 210. A player can collect the virtual energy 250 by traveling to the corresponding location of the virtual energy 250 in the actual world 200. The virtual energy 250 can be used to power virtual items and/or to perform various game objectives in the game. A player that loses all virtual energy 250 can be disconnected from the game.

According to aspects of the present disclosure, the location-based game can be a massive multi-player location-based game where every participant in the game shares the same virtual world. The players can be divided into separate teams or factions and can work together to achieve one or more game objectives, such as to capture or claim ownership of a virtual element. In this manner, the location-based game can intrinsically be a social game that encourages cooperation among players within the game. Players from opposing teams can work against each other during the location-based game. A player can use virtual items to attack or impede progress of players on opposing teams.

The location-based game can have various features to enhance and encourage game play within the location-based game. For instance, players can accumulate a virtual currency or other virtual reward that can be used throughout the game. Players can advance through various levels as the players complete one or more game objectives and gain experience within the game. Players can communicate with one another through one or more communication interfaces provided in the game. Players can also obtain enhanced "powers" or virtual items that can be used to complete game objectives within the game. Those of ordinary skill in the art, using the disclosures provided herein, should understand that various other game features can be included with the location-based game without deviating from the scope of the present disclosure.

Referring back FIG. 1, the computer-implemented location-based gaming system 100 will be discussed in more detail. The system 100 can include a client-server architecture, where a game server 110 communicates with one or more clients 120 over a network 130. Although one client 120 is illustrated in FIG. 1, any number of clients 120 can be connected to the game server 110 over the network 130. The server 110 can host a universal gaming module 112 that controls aspects of the location-based game for all players and receives and processes each player's input in the location based game. On the client-side, each client 120 can include a gaming module 125 that operates as a gaming application so as to provide a user with an interface to the system 100. The game server 110 transmits game data over the network 130 to the client 120 for use by the gaming module 125 at the client 120 to provide local versions of the game to players at locations remote from the game server 110. The server 110 can include a network interface for providing communications over the network 130. A network interface can include any suitable components for interfacing with one more networks, including for example, transmitters, receivers, ports, controllers, antennas, or other suitable components.

It will be appreciated that the term "module" refers to computer logic utilized to provide desired functionality. Thus, a module can be implemented in hardware, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM hard disk or optical or magnetic media.

The game server 110 can be any computing device and can include one or more processors and one or more computer-readable media. The computer-readable media can store instructions which cause the processor to perform operations. The game server 110 can include or can be in communication with a game database 115. The game database 115 stores game data used in the location-based game to be served or provided to the client(s) 120 over the network 130.

The game data stored in the game database 115 can include: (1) data associated with the virtual world in the location-based game (e.g. imagery data used to render the virtual world on a display device, geographic coordinates of locations in the virtual world, etc.); (2) data associated with players of the location-based game (e.g. player information, player experience level, player currency, current player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real world objects, landmarks, positions linked to virtual world elements (e.g. location of real world objects/landmarks, description of real world objects/landmarks, relevance of virtual elements linked to real world objects, etc.); (6) Game status (e.g. current number of players, current status of game objectives, player leaderboard, etc.); (7) data associated with player actions/input (e.g. current player positions, past player positions, player moves, player input, player queries, player communications, etc.); and (8) any other data used, related to, or obtained during implementation of the location-based game. The game data stored in the game database 115 can be populated either offline or in real time by system administrators and/or by data received from users/players of the system 100, such as from one or more clients 120 over the network 130.

The game server 110 can be configured to receive requests for game data from one or more clients 120 (for instance via remote procedure calls (RPCs)) and to respond to those requests via the network 130. For instance, the game server 110 can encode game data in one or more data files and provide the data files to the client 120. In addition, the game server 110 can be configured to receive game data (e.g. player positions, player actions, player input, etc.) from one or more clients 120 via the network 130. For instance, the client device 120 can be configured to periodically send player input and other updates to the game server 110, which the game server 110 uses to update game data in the game database 115 to reflect any and all changed conditions for the game.

As illustrated, the game server 110 can include a universal game module 112. The universal game module 112 hosts the location-based game for all players and acts as the authoritative source for the current status of the location-based game for all players. The universal game module 112 receives game data from clients 120 (e.g. player input, player position, player actions, landmark information, etc.) and incorporates the game data received into the overall location-based game for all players of the location-based game. The universal game module 112 can also manage the delivery of game data to the clients 120 over the network 130.

As will be discussed in more detail below, the game server 110 can further include a commercial game feature module 114. The commercial game feature module 114 can be separate from or a part of the universal game module 112. The commercial game feature module 114 can manage the inclusion of various game features within the parallel reality game that are linked with a commercial activity in the real world. For instance, the commercial game feature module 114 can receive requests from sponsors/advertisers 140, businesses 150, or other entities over network 130 (via a network interface) to include game features linked with commercial activity in the parallel reality game. The commercial game feature module 114 can then arrange for the inclusion of these game features in the parallel reality game.

The game server 110 can further include a data collection module 116. The data collection module 116 can be separate from or a part of the universal game module 112. The data collection module 116 can manage the inclusion of various game features within the parallel reality game that are linked with a data collection activity in the real world. For instance, the data collection module 116 can modify game data stored in the game database 115 to include game features linked with data collection activity in the parallel reality game. The data collection module 116 can also analyze and data collected by players pursuant to the data collection activity and provide the data for access by various platforms.

Other modules can be used with the game server 110. Any number of modules can be programmed or otherwise configured to carry out the server-side functionality described herein. In addition, the various components on the server-side can be rearranged. For instance, the game database 115 can be integrated into the game server 110. Other configurations will be apparent in light of this disclosure and the present disclosure is not intended to be limited to any particular configuration.

A client 120 can be any portable computing device that can be used by a player to interface with the gaming system 100. For instance, a client 120 can be a wireless device, a personal digital assistant (PDA), portable gaming device, cellular phone, smart phone, tablet, navigation system, handheld GPS system, wearable computing device, a display having one or more processors, or other such device. In short, a client 120 can be any computer-device or system that can execute a gaming module 125 to allow a player to interact with the game system 100.

The client 120 can include one or more processors and one or more computer-readable media. The computer-readable media can store instructions which cause the processor to perform operations. The client 120 can include various input/output devices for providing and receiving information from a player, such as a display screen, touch screen, touch pad, data entry keys, speakers, and/or a microphone suitable for voice recognition. The client 120 can further include a network interface for providing communications over the network 130. A network interface can include any suitable components for interfacing with one more networks, including for example, transmitters, receivers, ports, controllers, antennas, or other suitable components.

The gaming module 125 executed by the client 120 provides an interface between a player and the location-based game. The gaming module 125 can present a user interface on a display device associated with the client 120 that displays a virtual world (e.g. renders imagery of the virtual world) associated with the game and allows a user to interact in the virtual world to perform various game objectives. The gaming module 125 can also control various other outputs to allow a player to interact with the game without requiring the player to view a display screen. For instance, the gaming module 125 can control various audio, vibratory, or other notifications that allow the player to play the game without looking at the display screen. The gaming module 125 can access game data received from the game server 110 to provide an accurate representation of the game to the user. The gaming module 125 can receive and process player input and provide updates to the game server 110 over the network 130.

Because the gaming system 100 is for a location-based game, the client 120 is preferably a portable computing device, such as a smartphone or other portable device, that can be easily carried or otherwise transported with a player. A player can interact with the virtual world simply by carrying or transporting the client 120 in the actual world. The client 120 can include a positioning device 128 that monitors the position of a player during game play. The positioning device 128 can be any device or circuitry for monitoring the position of the client 120. For example, the positioning device 128 can determine actual or relative position by using a satellite navigation positioning system (e.g. a GPS system, a Galileo positioning system, the GLObal Navigation satellite system (GLONASS), the Bei-Dou Satellite Navigation and Positioning system), an inertial navigation system, a dead reckoning system, based on IP address, by using triangulation and/or proximity to cellular towers or Wi-Fi hotspots, and/or other suitable techniques for determining position.

As the player moves around with the client 120 in the real world, the positioning device 128 tracks the position of the player and provides the player position information to the gaming module 125. The gaming module 125 updates the player position in the virtual world associated with the game based on the actual position of the player in the real world. In particular, the location of the player in the virtual world can correspond to the location of the player in the real world. The gaming module 125 can provide player position information to the game server 110 over the network 130 such that the universal gaming module 112 keeps track of all player positions throughout the game. It should be understood that location information associated with a player is utilized only if permission is granted after the player has been notified that location information of the player is to be accessed and how the location information is to be utilized in the context of the game (e.g. to update player position in the virtual world). In addition, any location information associated with players will be stored and maintained in a manner to protect player privacy.

The network 130 can be any type of communications network, such as a local area network (e.g. intranet), wide area network (e.g. Internet), or some combination thereof. The network can also include a direct connection between a client 120 and the game server 110. In general, communication between the game server 110 and a client 120 can be carried via a network interface using any type of wired and/or wireless connection, using a variety of communication protocols (e.g. TCP/IP, HTTP, SMTP, FTP), encodings or formats (e.g. HTML, XML, JSON), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

In addition, in situations in which the systems and methods discussed herein access and analyze personal information about users, or make use of personal information, such as location information, the users may be provided with an opportunity to control whether programs or features collect the information and control whether and/or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Exemplary Game Interface

Figure 3:
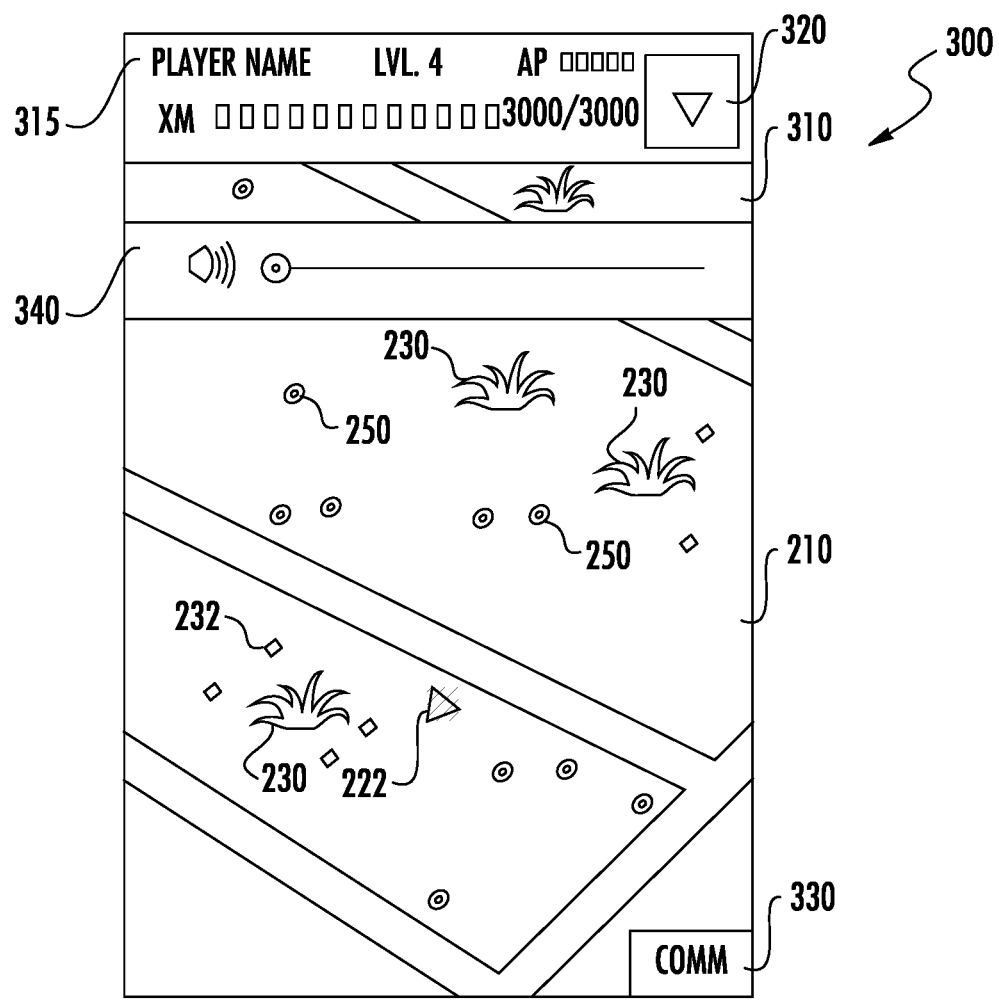
FIG. 3 depicts an exemplary game interface of a location-based game according to an exemplary embodiment of the present disclosure.

FIG. 3 depicts one particular embodiment of a game interface 300 that can be presented on a display of a client 120 as part of the interface between a player and the gaming system 100. The game interface 300 includes a display window 310 that can be used to display the virtual world 210 and various other aspects of the game, such as player position 222 and the locations of virtual elements 230, virtual items 232 and virtual energy 250 in the virtual world 210. The user interface 300 can also display other information, such as game data information, game communications, player information, and other information associated with the game. For example, the user interface can display player information 315, such as player name, experience level and other information. The user interface 300 can include a menu 320 for accessing various game settings and other information associated with the game. The user interface 300 can also include a communications interface 330 that enables communications between the game system and the player and between one or more players of the location-based game.

According to aspects of the present disclosure, a player can interact with the location-based game by simply carrying a client device around in the real world. For instance, a player can play the location-based game by simply accessing an application associated with the location based game on a smartphone and moving about in the real world with the smartphone. In this regard, it is not necessary for the player to continuously view a visual representation of the virtual world on a display screen in order to play the location based game. As a result, the user interface 300 can include a plurality of non-visual elements that allow a user to interact with the game. For instance, the game interface can provide audible notifications to the player when the player is approaching a virtual element or object in the game or when an important event happens in the location-based game. A player can control these audible notifications with audio control 340. Different types of audible notifications can be provided to the user depending on the type of virtual element or event. The audible notification can increase or decrease in frequency or volume depending on a player's proximity to a virtual element or object. Other non-visual notifications and signals can be provided to the user, such as a vibratory notification or other suitable notifications or signals.

Those of ordinary skill in the art, using the disclosures provided herein, should understand that numerous game interface configurations and underlying functionalities will be apparent in light of this disclosure. The present disclosure is not intended to be limited to any one particular configuration.

Exemplary Server-Client Flow Diagram

Figure 4:
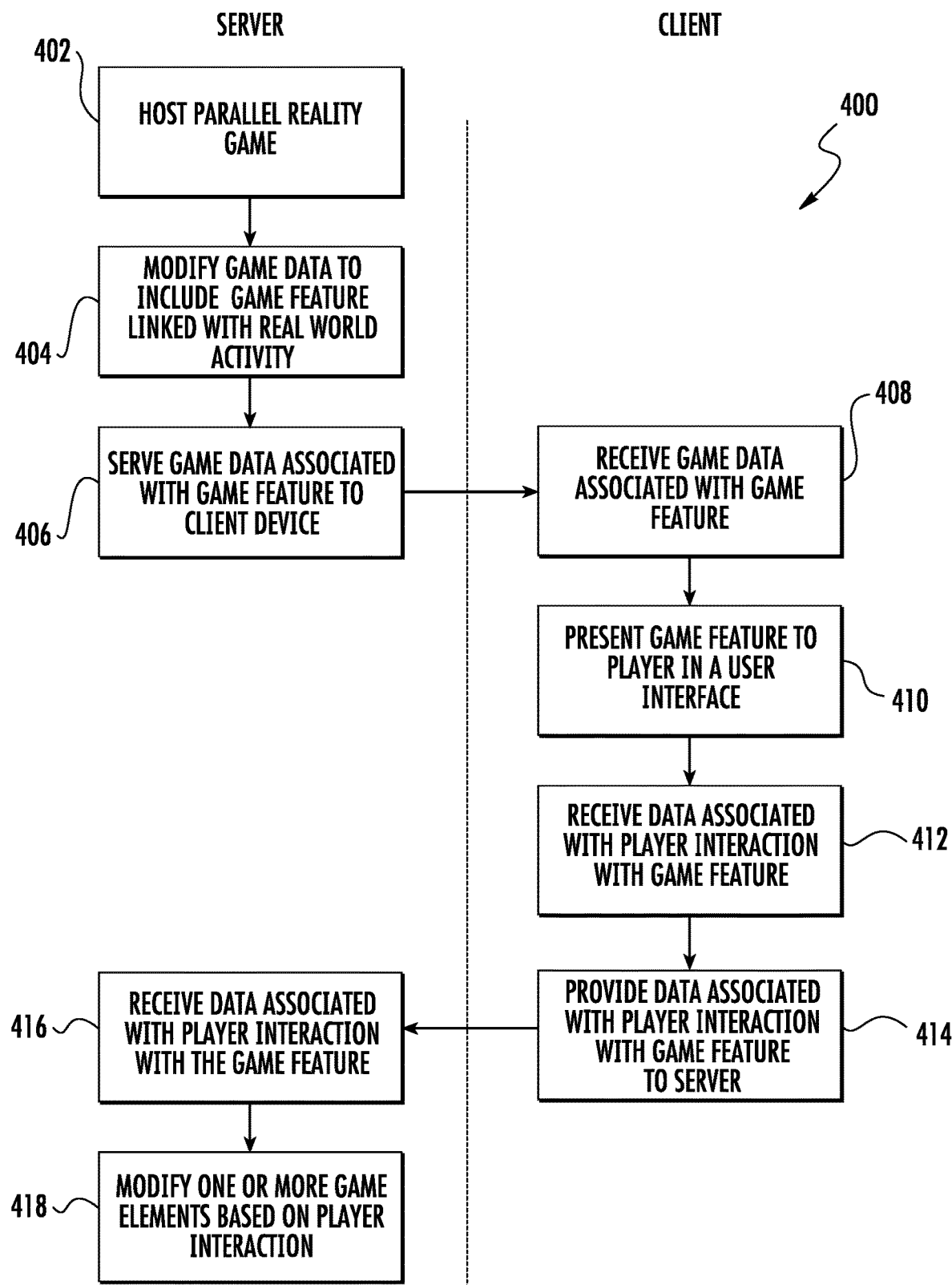
FIG. 4 depicts a server-client flow diagram of an exemplary method for linking real world activity with a location-based parallel reality game according to an exemplary embodiment of the present disclosure.

FIG. 4 depicts a client-server flow diagram of an exemplary method (400) for linking real world activity with a parallel reality game according to an exemplary embodiment of the present disclosure. The exemplary method (400) can be implemented using any suitable computing system, such as the client-server arrangement of the system 100 of FIG. 1. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

At (402), a server hosts the parallel reality game for a plurality of client devices. For instance, the game server 110 can host the parallel reality game for a plurality of client devices 120 over the network 130. Players can access the parallel reality game by communicating with the game server 110 over the network 130 via one or more client devices 120. In this manner, the game server 110 acts as an authoritative source of events for the parallel reality game.

At (404), the server can modify game data associated with the location-based game to include a game feature linked with a real world activity in the game. For instance, the game server 110 can modify, update, or add game data to the game database 115 such that a game feature linked with a real world activity is included in the parallel-reality game. A game feature linked with a real world activity can be any game feature designed to incentivize or encourage activity by players in the real world, including activities in the real world not directly related to the overall game objective for the parallel reality game. In particular embodiments, the game feature linked with a real world activity can be a game feature linked with a commercial activity in the real world or a game feature linked with a data collection activity in the real world. Exemplary game features linked with real world activities, such as commercial activity in the real world and/or data collection activity in the real world, will be discussed in more detail below.

At (406), the server serves the parallel reality game, including the game feature linked with the real world activity, to one or more client devices. For instance, the game server 110 serves the parallel reality game, including the game feature linked with real world activity, to one or more client devices 120 over the network 130. At (408), a client device, such as client device 120, receives the game data from the server including data associated with the game feature linked with the real world activity. The client device then presents the parallel reality game, including the game feature linked with the real world activity to a player (410). For instance, a client device 120 can display a visual representation of the virtual world. The virtual world can include the game feature, such as a virtual element located at a specific location in the virtual world to encourage or incentivize player activity in the real world.

At (412), the client device includes receiving data associated with player interaction with the game feature. For instance, a client device 120 can receive data as a result of a player action directed the game feature in the parallel reality game. The data associated with a player interaction can include data associated with a player navigating to a location of a particular virtual element and interacting with the virtual element. As another example, the data associated with a player interaction can include data associated with a player taking actions to complete a game objective or task. As another example, the data associated with a player interaction can include data associated with a player using a power up or other enhanced power provided to a player as part of the game feature linked with the real world activity. At (414), the client device provides the data associated with player interaction with the game feature to the server.

The data associated with the player interaction with the game feature can be received at the server (416). For instance, the game server 110 can receive the data associated with player interaction with the game feature from a client device 120 over the network 130. The server can then modify one or more game elements in the parallel reality game based on the data associated with the player interaction (418). For instance, the game server 110 can update game data stored in the game database 115 associated with a player to record the player's interaction with the game feature linked with the real world activity. In addition, the server can update game data to provide a reward, such as a virtual reward suitable for use in the parallel reality game, for interacting with the game feature linked with the real world activity. The virtual reward can include a virtual item, virtual energy, virtual currency, power up, enhanced power, experience points, or any other suitable reward.

Linking Commercial Activity with a Parallel Reality Game

Figure 5:
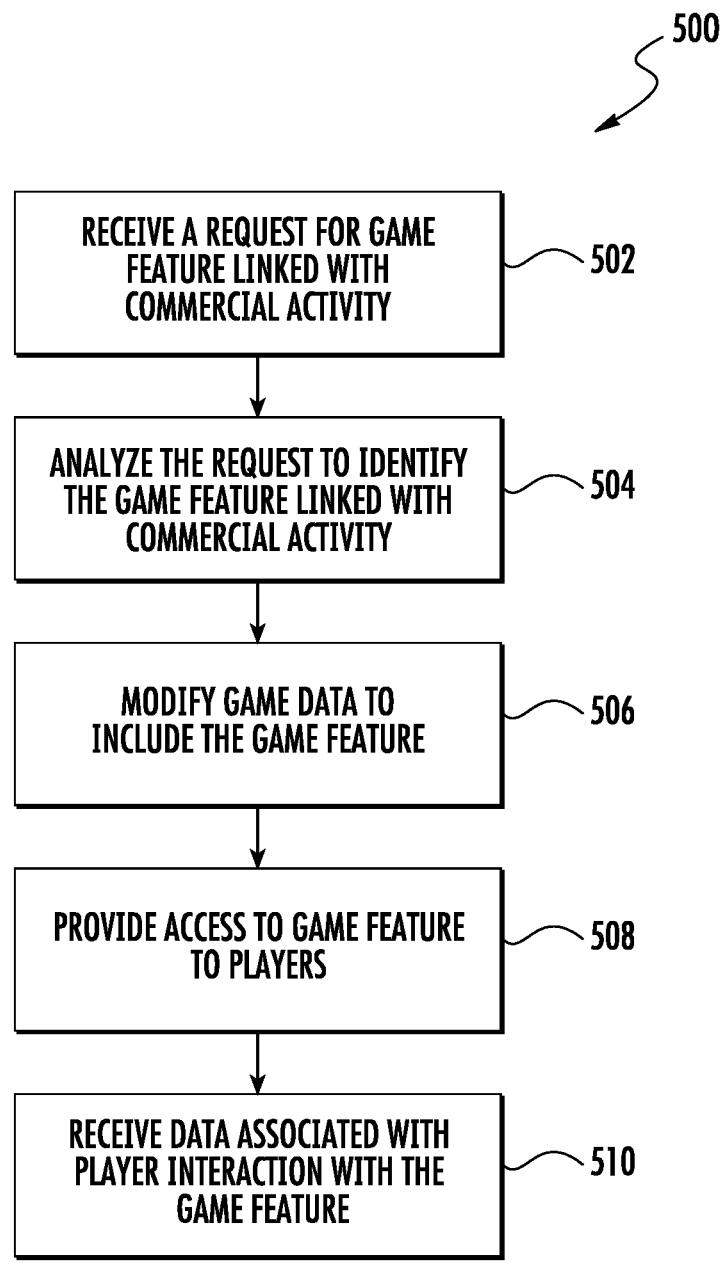
FIG. 5 depicts a flow diagram of an exemplary method for linking commercial activity with a location-based parallel reality game according to an exemplary embodiment of the present disclosure.

FIG. 5 depicts a flow diagram of an exemplary method (500) for linking commercial activity with a parallel reality game according to an exemplary embodiment of the present disclosure. The exemplary method (500) can be implemented using any suitable computing device(s), such as the game server 110 of FIG. 1. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

At (502), the method includes receiving a request for a game feature linked with a commercial activity to be included in the parallel reality game. The request can be for a game feature to be included in the parallel reality game that is linked with a commercial activity in the real world, such as any game feature that can be used to increase or incentivize commercial activity in the real world. For instance, the game feature can be the location of a virtual element in the virtual world. In particular, the game feature can include locating a virtual element in the virtual world at a location corresponding to the location of a commercial activity in the real world to attract potential customers to the location of the commercial activity. Alternatively, the game feature can be linked with the purchase of an object or service in the real world or can include providing a reward to a player that is suitable for use in a commercial transaction in the real world.

According to one aspect of the present disclosure, the request can be received from a remote computing device over a network. For instance, as shown in FIG. 1, sponsors/advertisers 140, businesses 150 or other entities can provide request data to the game server 110 over the network 130. The request data can include a request for a specific or general game feature to be included in the game. The request data can be submitted to the game server using a suitable user interface, such as a web application hosted by the game server 110 or other computing device in communication with the game server 110. The request can be part of an auction or other suitable format for submitting requests for features.

The request can also be provided to a manager, operator, or other individual associated with the parallel reality game. For instance, a sponsor, advertiser, business, or other entity can interface directly with an individual associated with the parallel reality game in person, over the telephone, by email, or through other communication interface. The individual associated with the parallel reality game can then format the request and provide the request data to a game server, such as game server 110, associated with the parallel reality game for processing and analysis.

Once the request for a game feature linked with a commercial activity is received, the request can be analyzed to identify game features linked with the commercial activity as shown at (504) of FIG. 5. For example, the request can be analyzed to identify the number and type of game features included in the request. The requested game features can also be analyzed to determine whether the particular feature is suitable for addition to the parallel reality game during a particular stage or phase of the game.

For example, referring to FIG. 1, the commercial game feature module 114 associated with game server 110 can analyze request data to identify suitable game features to be included in the game. The commercial game feature module 114 can access predetermined criteria and compare the request data to determine if the request data meets the predetermined criteria. The predetermined criteria can be directed to the format, content, or other attributes of the requested game feature or the request data itself.

In a particular implementation, the commercial game feature module 114 can periodically analyze all request data received and select which particular features to include at a particular stage or phase of the parallel reality game. For instance, the commercial game feature module 114 can enforce a limit on the number of game features linked with commercial activity that are included in the parallel reality game. In this manner, the commercial game feature module 114 can manage the inclusion of requested game features in the parallel reality game to prevent any requested game features from interfering with the overall theme, objectives, or other attribute of the parallel reality game.

At (506) of FIG. 5, the method can include modifying, updating, or adding game data to include the requested game features. For instance, the commercial game feature module 114 can manage game data stored in the game database 115 such that certain requested game features are included in the parallel reality game. Updating the game data can include, for instance, locating virtual elements at specified locations in the virtual world, providing virtual items and/or enhanced powers to specific players, associating tags or brands with virtual elements in the virtual world, and/or implementing a reward engine to distribute rewards suitable for commercial transactions in the real world to players that attain certain achievements or complete specified game objectives in the virtual world.

At (508), access to the parallel reality game with the requested game feature is provided to players of the parallel reality game. For instance, the game server 110 can host or provide access to the parallel reality game with the requested game feature to one or more clients 120 over the network 130. The requested game feature can be provided to all players of the parallel reality game or to selected players of the parallel reality game.

In one implementation, the game feature can be accessed only by those players that are within a predefined radius surrounding the location of the commercial activity linked with the game feature in the real world. For instance, the game server 110 can continuously monitor the position of players of the parallel reality game by receiving position information from clients 120 over the network 130. Based on this position information, the game server 110 can identify players within a predefined radius of the commercial activity. The predefined radius can be set to any magnitude. The game server 110 can provide access to the game feature to only those players within the predefined radius.

At (510) the method can include receiving player interaction associated with game feature. The player interaction can include a suitable interaction with the virtual element located in the virtual world corresponding to a location of commercial activity, the use of an enhanced power or virtual item obtained through commercial activity, or other suitable interaction. Player interaction with the game feature can be monitored and tracked, for instance, by the game server 110. This information can be periodically provided to the sponsor or other entity requesting the game feature to allow the sponsor or other entity to track the value or effectiveness of the game feature in encouraging commercial activity.

Exemplary Game Features Linked with Commercial Activity

Exemplary game features linked with commercial activity in the real world will now be discussed in detail. While exemplary game features will be discussed for purposes of illustration and discussion, those of ordinary skill in the art, using the disclosures provided herein, should understand that the scope of the present disclosure includes any game feature of a parallel reality game that can be used to encourage, increase, or enhance commercial activity in the real world.

One exemplary game feature linked with commercial activity in the real world includes locating a virtual element in the virtual world at a location corresponding to the location of a commercial activity in the real world. The virtual element can be any virtual element associated with the parallel reality game, such as a virtual element associated with a game objective, a virtual item used in the parallel reality game, virtual energy that can be collected as part of the parallel reality game, or other suitable virtual element. One or more game objectives can be associated with the virtual element to encourage players to interact with the virtual element. To interact with the virtual element, players of the parallel reality game will have to travel to the corresponding location of the virtual element in the real world. As a result, locating a virtual element at a location in the virtual world corresponding to the location of commercial activity in the real world can incentivize players to travel to the location of the commercial activity in the real world. This can increase exposure of a business and encourage commercial activity at a particular business or other entity in the real world.

For example, referring to FIG. 1, a sponsor/advertiser 140, business 150, or other entity can provide request data over network 130 to game server 110 associated with a request to locate a virtual element in the virtual world at a location corresponding to the location of a commercial activity, such as a retail or other point of sale location, associated with the sponsor/advertiser 140, business 150, or other entity. The commercial game feature module 114 can analyze the request and update game data stored in the game database 115 to include the virtual element in the virtual world at a location corresponding to the location of commercial activity in the real world. The commercial game feature module 114 can also identify players within a predefined radius of the commercial activity in the real world based on position information provided from clients 120 over the network 130. The game server 110 can then provide access to the parallel reality game with the requested game feature to the identified players. The players having access to the game feature would be encouraged or incentivized to travel to the location of the commercial activity in the real world in order to interact with the virtual element in the virtual world.

Another exemplary game feature linked with commercial activity in the real world can include linking game features, game objectives, or virtual items with the real world purchase of items or services. In particular, the purchase of the real world items/services can provide enhanced powers, access to hidden or locked game elements, virtual items, virtual energy and/or other game features to a player. This can incentivize players to travel to the business or other entity in the real world, purchase the item or service linked with the game feature, and spread word about the item or service among friends and other players of the parallel reality game.

For example, referring to FIG. 1, a sponsor/advertiser 140, business 150 or other entity can send request data to the game server 110 over the network 130 requesting that a real world purchase of an item or service associated with the sponsor/advertiser 140, business 150 or other entity to trigger access to virtual items, enhanced powers, or other enhancement in the virtual world. The commercial game feature module 114 can analyze the request and update game data stored in the game database 115. To obtain or unlock the enhanced powers virtual items, or the enhancements, a player will have to purchase the product or service linked with the enhanced power or item. After the player makes the purchase, the game server 110 can be notified of the purchase.

In one implementation, the player can input a code associated with the purchase of the item or service in a user interface associated with the parallel reality game. The code can be transmitted over the network 130 to the game server 110, which the game server 110 uses to unlock the enhancements for the player. In addition or in the alternative, the sponsor/advertiser 140, business 150 or other entity can notify the game server 110 of the purchase.

Once the game server 110 is notified of the purchase, the game server 110 can modify the game data stored in the game database 115 to provide the player making the real world purchase enhanced powers, virtual items, access to hidden areas, or other game features of value to the player. In this manner, the player is encouraged to participate in commercial activity in the real world in order to advance in the virtual world.

Another exemplary game feature linked with commercial activity in the real world involves the dispensing of rewards suitable for commercial transactions in the real world to players of the parallel reality game for certain achievements or game objectives within the parallel reality game. For instance, the game server 110 can implement a rewards module that tracks player progress and/or achievement in the parallel reality game. Upon the achievement of certain goals or the accomplishment of certain game objectives, the rewards module can provide the player with a reward suitable for use in a commercial transaction in the real world.

For example, referring to FIG. 1, a sponsor/advertiser 140, business 150, or other entity can provide request data over the network 130 to the game server requesting that the rewards module distribute a coupon or voucher to players that achieve a predetermined game objective or achievement. The rewards module can monitor player progress in the parallel reality game and provide the coupon or voucher to the player upon completing a game objective or other achievement. The coupon or other voucher can be used by the player as part of a real world commercial transaction. The coupon or other voucher provides a real world item that is of value to both the player and the business or other entity based on actions that occur in the virtual world. As a result, the link between the virtual world and the real world is enhanced such that actions in the virtual world can lead to rewards and increased commercial activity in the real world.

Another exemplary game feature linked with commercial activity in the real world can include the tagging or branding of virtual elements and/or virtual locations in the virtual world with brands/advertisements associated with a business or other entity in the real world. For example, a business or other entity can pay or arrange for certain brands or advertisements to be displayed in connection with virtual elements or virtual locations in the virtual world.

For example, referring to FIG. 1, a sponsor/advertiser 140, business 150, or other entity can provide request data over the network 130 to the game server requesting that particular virtual items in the virtual world be tagged or branded with a logo or other indicia associated with the sponsor/advertiser 140, business, 150, or other entity. The commercial game feature module 114 can analyze the request and update game data such that certain virtual elements are tagged or branded in the virtual world. As players navigate the virtual world by traveling in the real world, players are exposed to the branding and/or advertising associated with tagged or branded virtual items in the virtual world at locations where the brand or advertising may not typically be available or visible in the real world. As a result, the exposure of the business or other entity to players of the parallel reality game can be increased, potentially leading to increased commercial activity in the real world.

Linking Data Collection Activity with Parallel Reality Game

Information in the real world is constantly changing. Collection of data associated with the real world has many applications. For instance, updated data about the real world can be used to enhance or enrich data available online or in other platforms about real world locations, objects, features, and other information. A parallel reality game having a virtual world that parallels the real world can be used to help gather information about the changing real world.

Figure 6:
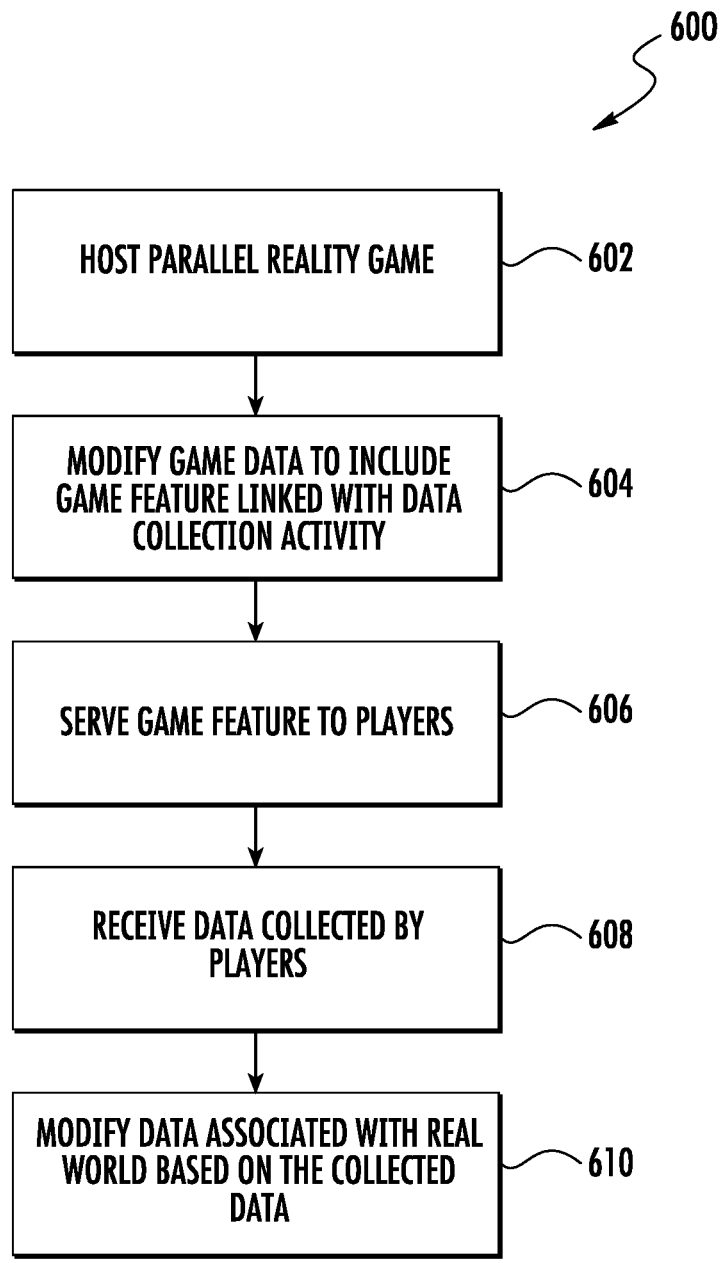
FIG. 6 depicts a flow diagram of an exemplary method for linking data collection activity with a location-based parallel reality game according to an exemplary embodiment of the present disclosure.

FIG. 6 depicts a flow diagram of a method (600) for linking data collection activity in the real world with a parallel reality game according to an exemplary embodiment of the present disclosure. The exemplary method (600) can be implemented using any suitable computing device(s), such as the game server 110 of FIG. 1. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

At (602), the method includes hosting the parallel reality game for a plurality of client devices. For instance, the game server 110 can host the parallel reality game for a plurality of client devices 120 over the network 130. Players can access the parallel reality game by communicating with the game server 110 over the network 130 via one or more client devices 120. At (604), the method includes modifying game data associated with the parallel reality game to include a game feature linked with a data collection activity in the real world. For instance, the data collation module 116 can manage game data stored in the game database 115 such that certain game features linked with data collection activity are included in the parallel reality game. A game feature linked with data collection activity in the real world can be any game feature that can directly and/or indirectly lead to the collection of data about real world objects, features, or other information associated with the real world.

An exemplary game feature directly linked with data collection activity can include a game objective or task in the virtual world that involves acquiring information about the real world and providing this information as a condition for completion of the game objective. For example, a game objective associated with a virtual element can require a player to take a photo of a particular landmark, art object, store front, or other feature located in the real world at a location in the real world corresponding to the location of the virtual element. In return for completing the game objective, the player can receive a suitable reward, such as a virtual reward suitable for use in the virtual world or a reward suitable for use in the real world. For instance, the reward can be in the form of virtual items/energy/currency or other virtual elements. The virtual reward can also include enabling some element of game play (e.g. hidden tasks/items, power ups, etc.) that may not be available to other players that do not interact with the game feature.

An exemplary game feature indirectly linked with data collection activity can include placing virtual elements at particular locations in the virtual world so that actions players take to interact with the virtual elements indirectly reveal information about the real world. For instance, one could place a virtual element in a park or hiking area. The game system could then track player movements in the park or hiking area as part of the parallel reality game to allow the player to navigate the virtual world. By tracking the players corresponding movements in the real world as the players navigate the virtual world, information about the location of traversable paths in an the area can be collected. In addition, rate of movement of players in a particular area and/or the altitude of players can be monitored to infer terrain information associated with an area in the real world.

At (606), the method includes serving the parallel reality game including the game feature to one or more client devices used by players of the parallel reality game. For instance, the game server 110 can provide game data associated with the game feature to client devices 120 over the network 130. At (608), the method includes receiving data collected by players pursuant to the data collection activity in the real world. For instance, the game server 110 can receive data collected associated with a real world object pursuant to a game object or task within the parallel reality game. The collected data can include a photograph, a sound recording, textual information, or other data collected by the player, such as the locations of WiFi hotspots or Bluetooth connections.

According to one particular implementation, the collected data can be position information associated with the player tracked by the game server 110 as the player interacts with the game feature. For instance, the game feature linked with the data collection activity can include placement of a virtual element at a specific location in the virtual world. The game server 110 can monitor a user's position in the real world as the user navigates the real world to travel to the corresponding location of the virtual element in the virtual world. This position information can be used to infer characteristics of the real world, such as the location of traversable paths in the real world, terrain information, location of specific object in the real world, and other information.

After receiving the data, the method can include modifying (e.g. updating, enriching, adding to, or other suitable modification) data associated with the real world based on the collected data (610). For example, the data collected by the player pursuant to the data collection activity can be used to update information about real world objects, features, locations for later access by various platforms, such as online search engines, encyclopedias, geographic information systems (e.g. map information systems, virtual globe information systems), etc.

As multiple players interact with the game feature linked to data collection activity in the real world, the accuracy of the data collected can be increased. For example, if multiple players take a photograph of an art object from multiple different angles, the photographs can be used to generate a three dimensional and/or panoramic view of the art object.

In addition, by knowing a player's location in the real world at the time of the data collection action, position data can be associated with the collected data to further enrich the collected data. For example, if N players provide a photograph of an art object at a geographic position having longitude X, latitude Y and one player provides a photograph of the art object at a different geographic position of longitude Z, latitude W, it can be determined, for instance by the game server 110 or other computing device, that the actual location of the art object is near X, Y and not near Z, W.

One exemplary application of the modified real world data includes updating data associated with the parallel reality game, such as data stored in the game database 115. In particular, data in the game database associated with real world objects linked to virtual features can be enriched based on data collected pursuant to the data collection activity. In this manner, the parallel reality game can be made to more closely conform to changing real world conditions as identified by data collection activities linked to game features in the parallel reality game. By providing a method for enriching game data associated with real world, the link between the real and the virtual world can be improved, providing an enhanced parallel reality for the parallel reality game.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method comprising:
    hosting, at a game server, a parallel reality game, the parallel reality game having a virtual world with a geography that parallels at least a portion of the geography of the real world such that players can navigate the virtual world by moving to different locations in the real world;
    transmitting, by the game server to a client device of a player of the parallel reality game, game data indicating that a virtual element is at a virtual location in the virtual world that corresponds to a first location in the real world, the client device located at a second location in the real world different than the first location;

receiving, by the game server, position information of the client device as the player travels from the second location to the first location to perform a game objective of the parallel reality game;

responsive to the player interacting with the virtual element, receiving, from the client device, a picture captured by the player via the client device;

creating an assembled media item by combining the received picture with at least one additional picture captured by another player at the first location;

updating, in a game database of the parallel reality game, game data associated with the virtual element at the virtual location corresponding to the first location in the real world to include the assembled media item; and providing, by the game server to a second client device of a second player of the parallel reality game, the updated game data about the virtual element of the virtual world.

2. The method of claim 1, further comprising:

providing a reward to the player based on the player reaching the first location.

3. The method of claim 1, wherein the assembled media item is a three dimensional image.

4. The method of claim 1, wherein the assembled media item is a panoramic image.

5. A non-transitory computer-readable medium storing computer-executable instructions which when executed by one or more computer processors cause the one or more computer processors to perform operations comprising:

hosting, at a game server, a parallel reality game, the parallel reality game having a virtual world with a geography that parallels at least a portion of the geography of the real world such that players can navigate the virtual world by moving to different locations in the real world;

transmitting, by the game server to a client device of a player of the parallel reality game, game data indicating that a virtual element is at a virtual location in the virtual world that corresponds to a first location in the real world, the client device located at a second location in the real world different than the first location;

receiving, by the game server, position information of the client device as the player travels from the second location to the first location to perform a game objective of the parallel reality game;

responsive to the player interacting with the virtual element, receiving, from the client device, a picture captured by the player via the client device;

creating an assembled media item by combining the received picture with at least one additional picture captured by another player at the first location;

updating, in a game database of the parallel reality game, game data associated with the virtual element at the virtual location corresponding to the first location in the real world to include the assembled media item; and providing, by the game server to a second client device of a second player of the parallel reality game, the updated data about the virtual element of the virtual world.

6. The computer-readable medium of claim 5, wherein the virtual world includes at least one of the first location and the second location.

7. The computer-readable medium of claim 5, wherein the computer-executable instructions further cause the one or more computer processors to perform operations comprising:

providing a reward to the player based on the player reaching the first location.

8. The method of claim 5, wherein the assembled media item is a three dimensional image.

9. The method of claim 5, wherein the assembled media item is a panoramic image.

* * * * *

UNITED STATES PATENT AND TRADEMARK OFFICE
CERTIFICATE OF CORRECTION

PATENT NO. : 10,646,783 B1
APPLICATION NO. : 15/586129
DATED : May 12, 2020
INVENTOR(S) : Chris Hibbert et al.

Page 1 of 1

It is certified that error appears in the above-identified patent and that said Letters Patent is hereby corrected as shown below:

In the Claims

Column 22, Claim 6, Line 24, delete "computer-readable medium" and insert -- non-transitory computer-readable medium --

Column 22, Claim 7, Line 27, delete "computer-readable medium" and insert -- non-transitory computer-readable medium --

Column 22, Claim 8, Line 33, delete "method" and insert -- non-transitory computer-readable medium --

Column 22, Claim 9, Line 35, delete "method" and insert -- non-transitory computer-readable medium --

Signed and Sealed this
Sixteenth Day of February, 2021

Drew Hirshfeld
*Performing the Functions and Duties of the
Under Secretary of Commerce for Intellectual Property and
Director of the United States Patent and Trademark Office*